United States Patent
Alkalay et al.

(10) Patent No.: US 10,853,286 B2
(45) Date of Patent: *Dec. 1, 2020

(54) PERFORMANCE IMPROVEMENT FOR AN ACTIVE-ACTIVE DISTRIBUTED NON-ALUA SYSTEM WITH ADDRESS OWNERSHIPS

(71) Applicant: EMC IP HOLDING COMPANY LLC, Hopkinton, MA (US)

(72) Inventors: Amitai Alkalay, Kadima (IL); Zvi Schneider, Tel Aviv (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,328

(22) Filed: Oct. 15, 2019

(65) Prior Publication Data

US 2020/0042478 A1 Feb. 6, 2020

Related U.S. Application Data

(63) Continuation of application No. 16/050,400, filed on Jul. 31, 2018, now Pat. No. 10,489,321.

(51) Int. Cl.
*G06F 13/28* (2006.01)
*G06F 12/1081* (2016.01)
*G06F 12/02* (2006.01)

(52) U.S. Cl.
CPC .......... *G06F 13/28* (2013.01); *G06F 12/0292* (2013.01); *G06F 12/1081* (2013.01); *G06F 2212/621* (2013.01); *G06F 2213/28* (2013.01)

(58) Field of Classification Search
CPC ...... G06F 3/0629; G06F 3/0635; G06F 12/02; G06F 12/0292; G06F 12/06; G06F 12/08;
(Continued)

(56) References Cited

U.S. PATENT DOCUMENTS 5,790,775 A 8/1998 Marks et al.
6,092,084 A 7/2000 Clark et al.
(Continued)

OTHER PUBLICATIONS

James-Roxby, Philip B. et al. "An efficient content-addressable memory implementation using dynamic routing". Proceedings of the 9th Annual IEEE Symposium on Field-Programmable Custom Computing Machines (FCCM'01). 2001. IEEE. (Year: 2001).*
(Continued)

*Primary Examiner* — Thomas J. Cleary
(74) *Attorney, Agent, or Firm* — Daly, Crowley Mofford & Durkee, LLP

(57) ABSTRACT

An aspect of performance improvement for an active-active distributed non-ALUA (asymmetrical logical unit assignment) system with address ownerships includes receiving, by a routing module of a content-addressable storage system, an input/output (IO) request; and determining, by the routing module from a table that provides a listing of addresses and compute nodes having ownership to the address, a target location of the IO request. The target location specifies an address. An aspect also includes determining, by the routing module, a mapping between each of the compute modules and a physical path to corresponding storage controllers, an address owner of a storage controller port of a storage controller that owns the address of the IO; selecting a physical path associated with the address owner; and transmitting, by the routing module, the IO request to the storage controller port via a direct call.

20 Claims, 8 Drawing Sheets

(58) Field of Classification Search
CPC .. G06F 12/10; G06F 12/1036; G06F 12/1081; G06F 13/14; G06F 13/16; G06F 13/161; G06F 13/1652; G06F 13/1657; G06F 13/1663; G06F 13/28; G06F 2212/621; G06F 2213/28
See application file for complete search history.

(56) References Cited

U.S. PATENT DOCUMENTS

| | | |
|---|---|---|
| 7,203,741 B2 | 4/2007 | Marco et al. |
| 7,719,443 B1 | 5/2010 | Natanzon |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,838,850 B2 | 9/2014 | Dommeti et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,972,657 B1 | 3/2015 | Armangau et al. |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,208,162 B1 | 12/2015 | Hallak et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,106 B1 | 6/2016 | Ben-Moshe et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,396,243 B1 | 7/2016 | Halevi et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |

(56) References Cited

U.S. PATENT DOCUMENTS

| | | |
|---|---|---|
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,606,870 B1 | 3/2017 | Meiri et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,489,321 B1 | 11/2019 | Alkalay et al. |
| 10,601,890 B2 | 3/2020 | Douros et al. |
| 10,664,397 B2 | 5/2020 | Shveidel et al. |
| 2003/0101228 A1 | 5/2003 | Busser et al. |
| 2006/0220533 A1 | 10/2006 | Achiwa et al. |
| 2007/0050575 A1 | 3/2007 | Uratani et al. |
| 2009/0100441 A1 | 4/2009 | Wolman et al. |
| 2011/0029730 A1 | 2/2011 | Durocher et al. |
| 2014/0185627 A1 | 7/2014 | Ditya |
| 2014/0258608 A1 | 9/2014 | Viswanatha |
| 2014/0351545 A1 | 11/2014 | Nakajima |
| 2016/0085460 A1 | 3/2016 | Chandrashekar |
| 2017/0242771 A1 | 8/2017 | Khemani et al. |
| 2020/0250144 A1* | 8/2020 | Natanzon ............ G06F 16/1748 |

OTHER PUBLICATIONS

EMC Corporation, "Introduction to the EMC XtremIO Storage Array (Ver. 4.0);" White Paer; Apr. 2015; 65 Pages.

Swami, "XtremIO Hardware/Software Overview & Architecture Deepdive;" Retrieved from https://vjswami.com/2013/11/13/xtremio-hardwaresoftware-overview-architecture-deepdive/; Nov. 13, 2013; 18 Pages.

U.S. Non-Final Office Action dated May 15, 2019 for U.S. Appl. No. 16/050,400; 17 Pages.

Response to U.S. Non-Final Office Action dated May 15, 2019 for U.S. Appl. No. 16/050,400; Response filed Aug. 12, 2019; 11 Pages.

Notice of Allowance dated Sep. 5, 2019 for U.S. Appl. No. 16/050,400; 8 Pages.

U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.

(56) References Cited

OTHER PUBLICATIONS

U.S. Appl. No. 15/379,940, filed Dec. 15, 2016, Baruch et al.
U.S. Appl. No. 15/386,754, filed Dec. 21, 2016, Shemer et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.
U.S. Appl. No. 16/048,763, filed Jul. 30, 2018, Schneider et al.
U.S. Appl. No. 16/179,295, filed Nov. 2, 2018, Natanzon et al.
U.S. Appl. No. 16/261,174, filed Jan. 29, 2019, Natanzon et al.
Notice of Allowance and Issue Fee Due dated Apr. 8, 2020, U.S. Appl. No. 16/050,075, filed Jul. 31, 2018, 14 pages.

* cited by examiner

PERFORMANCE IMPROVEMENT FOR AN ACTIVE-ACTIVE DISTRIBUTED NON-ALUA SYSTEM WITH ADDRESS OWNERSHIPS

BACKGROUND

Storage systems provide content-based deduplicated data storage in which data block addresses may be generated from data content. As the costs of solid-state memory decrease, organizations can consider using systems that can store and process terabytes of data SUMMARY This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for performance improvement for an active-active distributed non-ALUA system with address ownerships. The method includes receiving, by a routing module of a content-addressable storage system, an input/output (IO) request; and determining, by the routing module from a table that provides a listing of addresses and compute nodes having ownership to the address, a target location of the IO request. The target location specifies an address. The method also includes determining, by the routing module, a mapping between each of the compute modules and a physical path to corresponding storage controllers, an address owner of a storage controller port of a storage controller that owns the address of the IO; selecting a physical path associated with the address owner, and transmitting, by the routing module, the IO request to the storage controller port via a direct call.

Another aspect may provide a system for performance improvement for an active-active distributed non-ALUA system with address ownerships in a storage system. The system includes a memory having computer-executable instructions and a processor. The processor executes the computer-executable instructions. When executed by the processor, the computer-executable instructions cause the processor to perform operations. The operations include receiving, by a routing module of a content-addressable storage system, an input/output (IO) request; and determining, by the routing module from a table that provides a listing of addresses and compute nodes having ownership to the address, a target location of the IO request. The target location specifies an address. The operations also include determining, by the routing module, a mapping between each of the compute modules and a physical path to corresponding storage controllers, an address owner of a storage controller port of a storage controller that owns the address of the IO; selecting a physical path associated with the address owner, and transmitting, by the routing module, the IO request to the storage controller port via a direct call.

Another aspect may provide a computer program product embodied on a non-transitory computer readable medium. The computer program product includes instructions that, when executed by a computer, causes the computer to perform operations. The operations include receiving, by a routing module of a content-addressable storage system, an input/output (IO) request; and determining, by the routing module from a table that provides a listing of addresses and compute nodes having ownership to the address, a target location of the IO request. The target location specifies an address. The operations also include determining, by the routing module, a mapping between each of the compute modules and a physical path to corresponding storage controllers, an address owner of a storage controller port of a storage controller that owns the address of the IO; selecting a physical path associated with the address owner; and transmitting, by the routing module, the IO request to the storage controller port via a direct call.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1A:
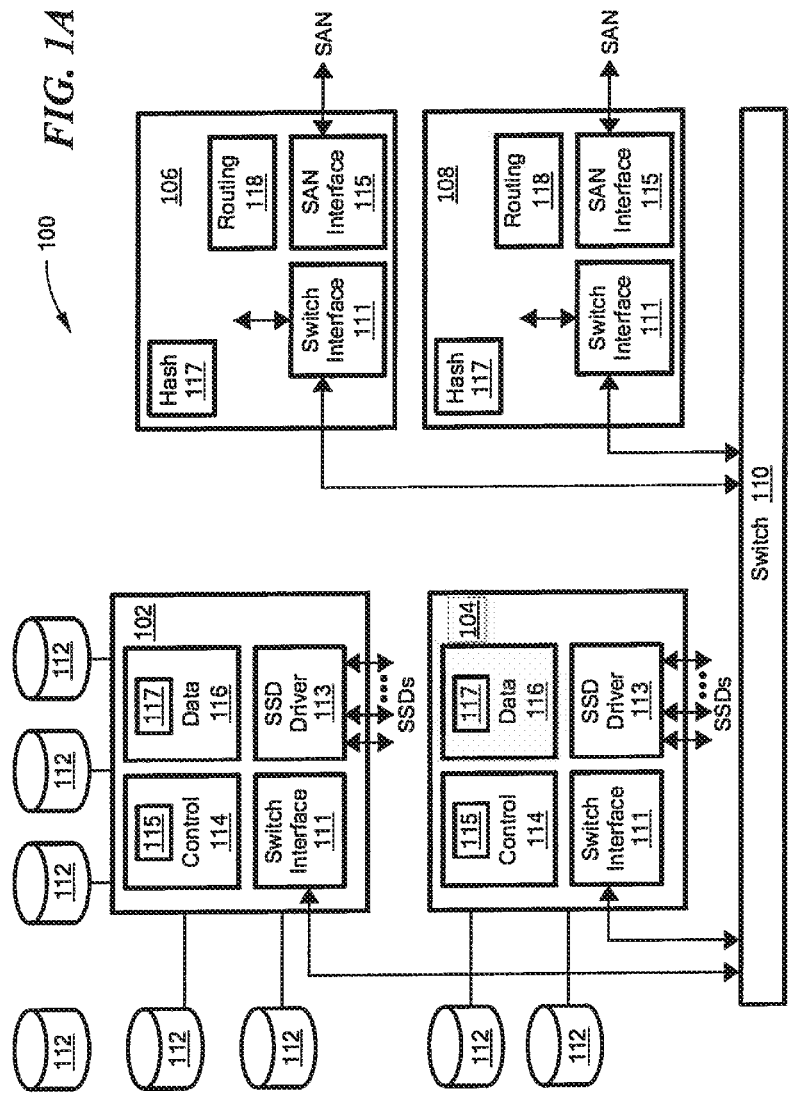
FIG. 1A is a block diagram of a content-based storage system having multi-level cache for deduplicated storage.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In some embodiments "asymmetrical logical unit assignment" (ALUA) is an industry stand protocol for identifying optimized paths between a storage system and a host. ALUA enables the initiator to query the target about path attributes such as primary and secondary paths. It also allows the target to communicate events back to the initiator.

In some embodiments, an active-active (also referred to as dual active) array is a storage array configuration in which two or more storage controllers collaborate to process inputs/outputs (IOs).

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 117 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 108.

The routing systems 118 may use the hash values calculated from data blocks to select control systems 114 for distribution. More particularly, selection of the control system 114 may use hash values, or may rely on the user address and not on the content (hash). The hash value may, however, be used for selecting the data system 116, and for setting the physical location for data storage within the data system.

In example embodiments, control modules 114 can include a C cache 115 and the data modules 116 can include a D cache 117. As explained more fully below, the C cache 115 can include addresses, address hashes, and physical data location information and the D cache 117 can include, for each bucket, a filter, a hash to address, and bucket information.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 1B:
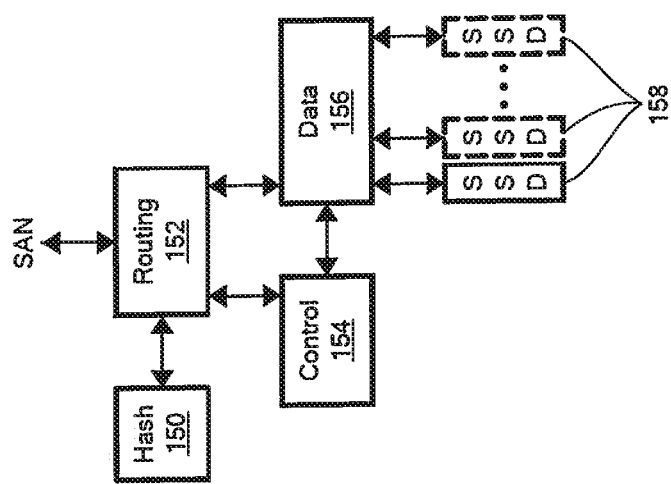
FIG. 1B illustrates further detail of the system of FIG. 1A.

FIG. 1B is an example of a system that can include a hash system 150 communicatively coupled to a routing system 152, which can be communicatively coupled to a control system 154 and a data system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

Figure 2:
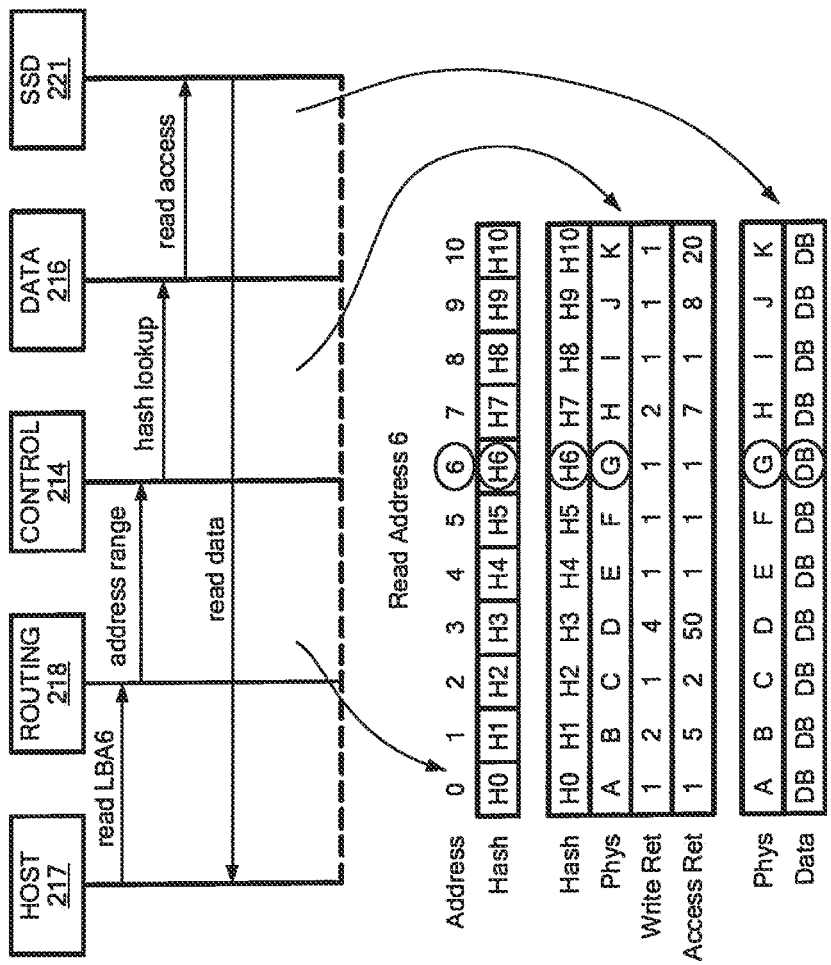
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4 K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented, If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
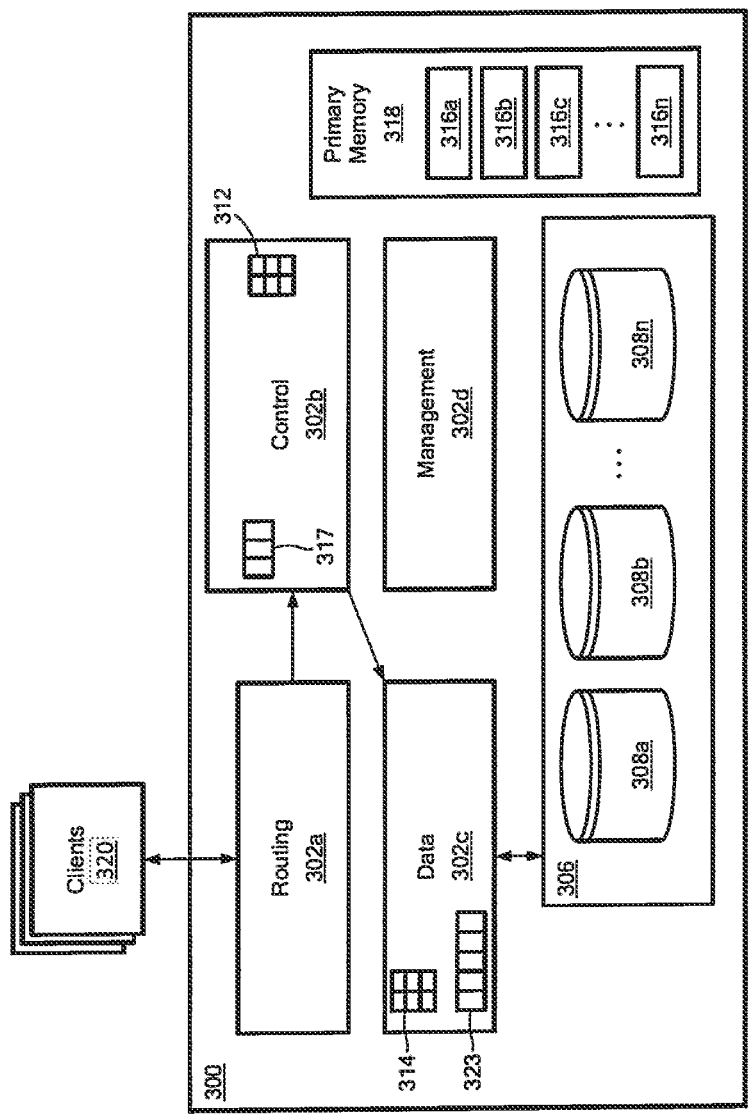
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between I/O addresses associated with data and the corresponding chunk hashes. As shown in FIG. 3, this mapping may be maintained using a data structure 312, referred to herein as an "I/O address to chunk hash mapping table" or "A2H table," (also known as A→H table) according to some embodiments. In one embodiment, I/O addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, meta data can include for each address the hash value of the content. If the basis for deduplication is 16 KB, then the meta data holds for each address the short hash value of the data to which the address points. In cases where access to the volume is in larger chunks than the size of the basic hash value, the meta data for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the meta data of the hash from the disk to verify if such a hash exists. It will be appreciated that meta data structures may consume most of system memory, e.g., DRAM, in the storage system, so that the meta data limits the total size of the storage system.

Figure 4:
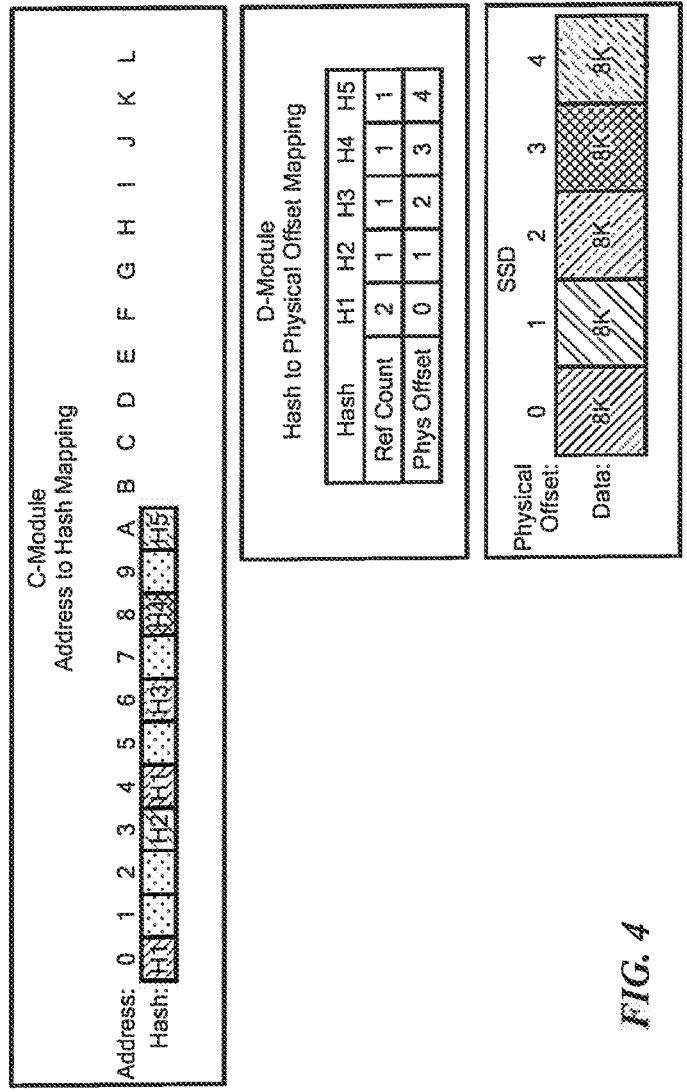
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

Modern active-active storage systems like XtremIO distribute the ownership of the address space and the ownership of the content space between the storage controllers. In content-addressable systems (CASs), the ownerships are not divided per volume, and there is no affinity of a specific volume to a specific storage controller. Dual layer mapping is often used in this case, which means there are two internal hops in each round trip. The embodiments described herein provide a way to reduce one of the hops, resulting in a performance improvement.

A content-addressable storage system, such as XtremIO has two mapping layers for accessing the volume data. There is a mapping layer from address in the volume to a fingerprint of the data (hash value of the data), and a second layer that maps the hash to the location on the flash drive. A scale-out system like XtremIO distributes the address-space and the hash space between all the storage controllers such that each storage controller has some address space ownership (address slices) and some hash space ownership (hash slices). Each IO can be sent to any of the storage controllers. The router module (R module) fetches the SCSI command and parses it. Then, it sends it to the relevant compute module (C module) that is responsible for the specific address. Each C module has a mapping of address to hash, and a table stating which data module (D module) owns this hash space and should handle this command. The data module maps the hash to the physical location on the flash drive Turning now to FIG. 5 a diagram depicting address space ownership distribution between different C modules and the A-C function that maps between address to C module. Since the address space of each volume is spread across all the storage controllers (across all the C modules), the host cannot use well-known methods like SCSI ALUA in order to use an optimized path. Each volume address can be owned by a different C module, so an optimized path per volume does not exist. In addition, using standard multi-path tools will randomly spread the SCSI commands between the storage controllers, forcing a hop between the R module and the C module.

The embodiments described herein improve the SCSI command latency by reducing one hop from the IO flow. This will improve the host performance and indirectly improve the storage overall performance by using less resources for each IO. The method for performance improvement for an active-active distributed non-ALUA system with address ownerships introduces a new mechanism in the host multipathing software so it will be aware of the storage array address ownerships (a→c table) and will attempt to choose the IO path such that the address owner is local to the target. This will allow the host to send the IO to the specific storage controller port which owns the address of the IO, reducing the R to C hope (the R module will initiate a direct call to the C module instead of sending the data via RDMA. RDMA, or remote direct memory access, is a technology that allows computers in a network to exchange data in main memory without involving the processor, cache, or operating system of either computer.

For example, in XtremIO, the specific path for each IO is chosen according to the following calculation:

slice=(addr>>8) & (1<<10)−1)

c_mdl=a2c_table[slice]

path=path_table[c_mdl];

wherein the a→c table has 1024 entries (slices) that were initialized to provide for each slice the relevant c module that owns it. Path_table is a mapping between the c module and a physical path.

For example, in XtremIO the slice ownership is coded inside the address. This slice number is found by looking at the leftmost 10 bits out of the rightmost 18 bits of the address. This provides a slice number between 0 to 1023 (1024 slices overall). Then a table is accessed that which C module owns this specific slice, so the exact path from the path table can be determined.

There are cases where address ownerships change, and the a→c table can change (e.g., during failover of one of the storage controllers or during a cluster expansion where new storage controllers are added to the scale-out system). In these cases, the process will still work because the R module still exists and knows how to handle IOs aimed to different C modules.

In a further embodiment, the a→c table may be modified to include the full information of rerouting ownerships in case of failures or expansions. Whenever the host is notified that a storage controller is down, or a new storage controller is part of the system, it will update its active a→c table according to the new configuration.

Figure 5:
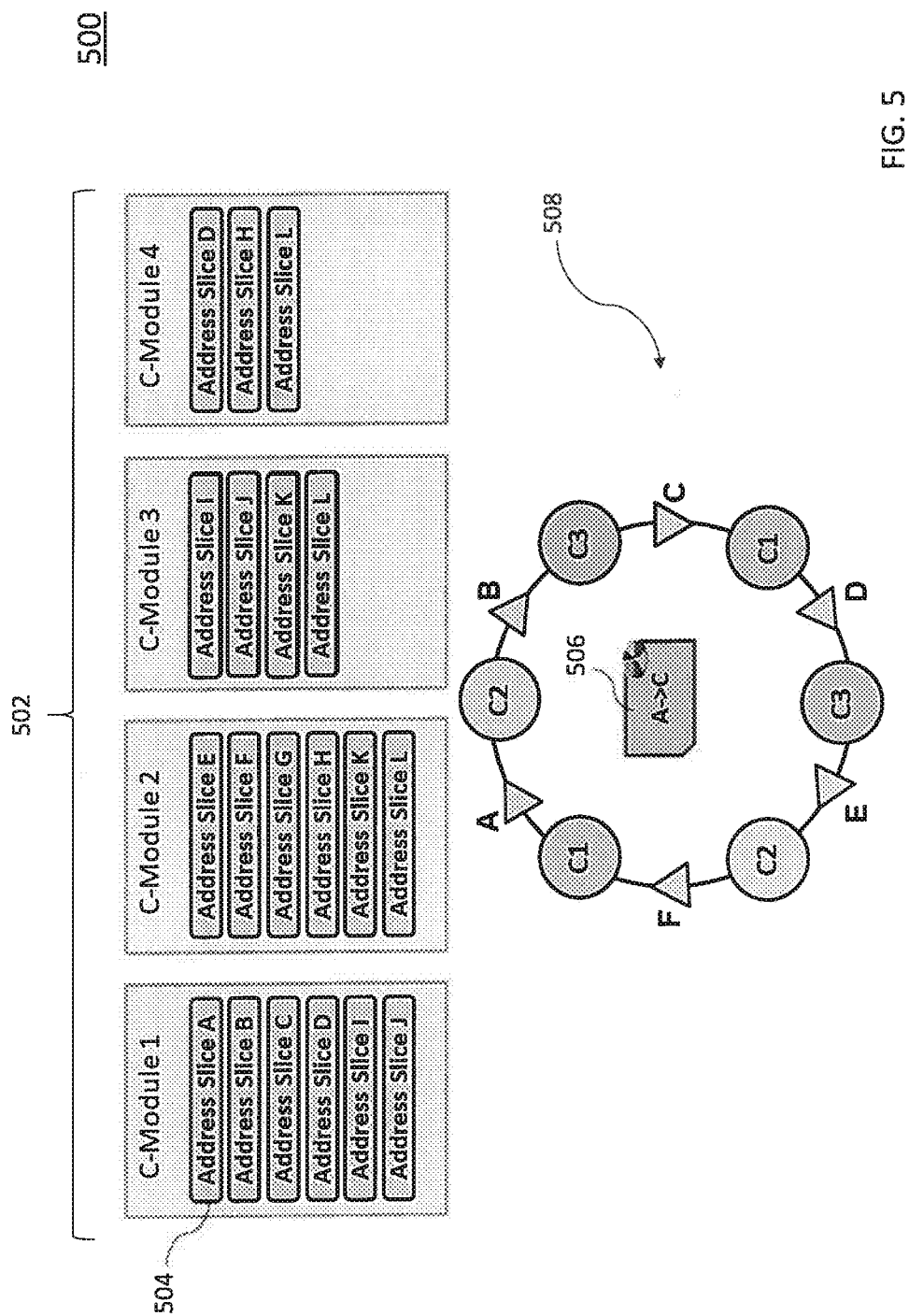
FIG. 5 is a diagram illustrating address space ownership distribution between different C modules and the A-C function that maps between address to C module.

FIG. 5 illustrates a current ownership model in XtremIO. Each C module 502 owns a number of address slices 504. There is an a2c table 506 that maps addresses to the C module via the slice calculation described above. The circle 508 of different C modules how ownership changes during failover.

Figure 6:
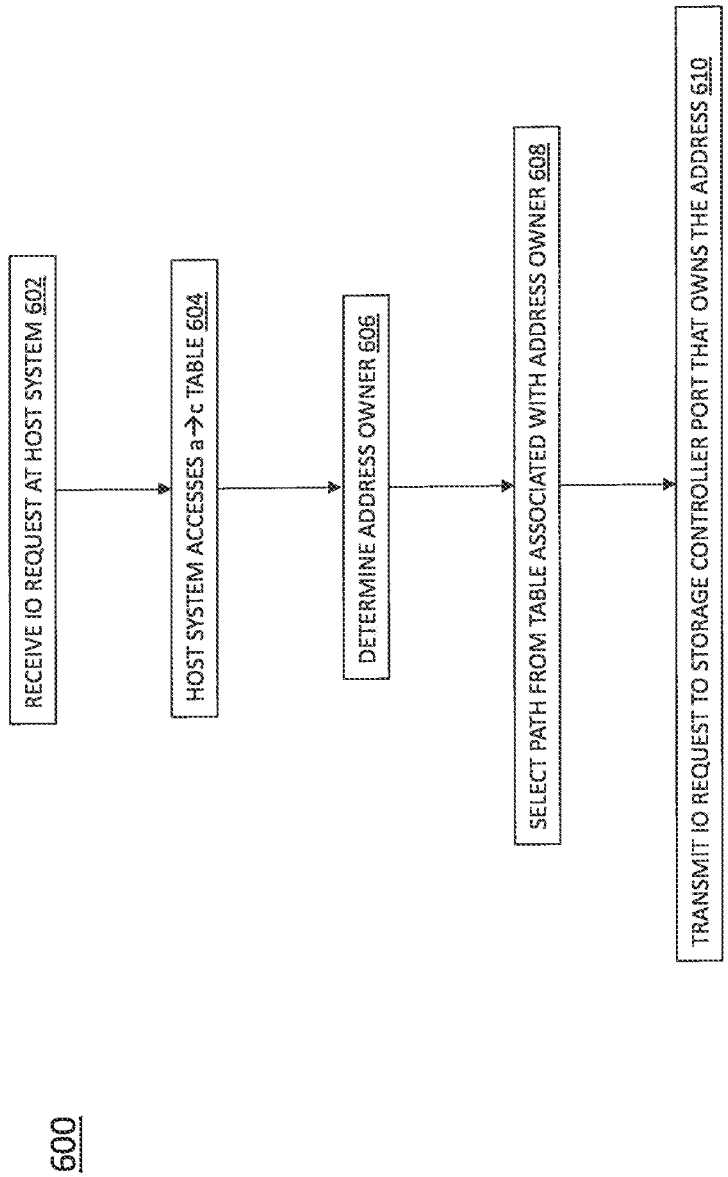
FIG. 6 is a flow diagram for implementing performance improvement for an active-active distributed non-ALUA system with address ownerships.

Turning now to FIG. 6, a flow diagram describing a process 600 for performance improvement for an active-active distributed non-ALUA system with address ownerships will now be described. In block 602, the process 600 receives an IO request. The host, e.g., through multipathing software, accesses the a→c table in block 604. The a2c module, as described above, is a component that provides services (of address to c module). It may reside near the "hash" component, as it serves the router module. It may also be part of the multipathing software described herein.

The process 600 determines the target of the IO. The target indicates the target port or path. The target may be determined from the a→c table accessed above. In block 606, the process 600 determines the address owner of the port that owns the IO.

In block 608, the process 600 selects a path associated with the address owner. The path may be selected from the path table which maps the compute modules to physical paths. In block 610, the process 600 includes transmitting the IO to a storage controller port that owns the address.

Figure 7:
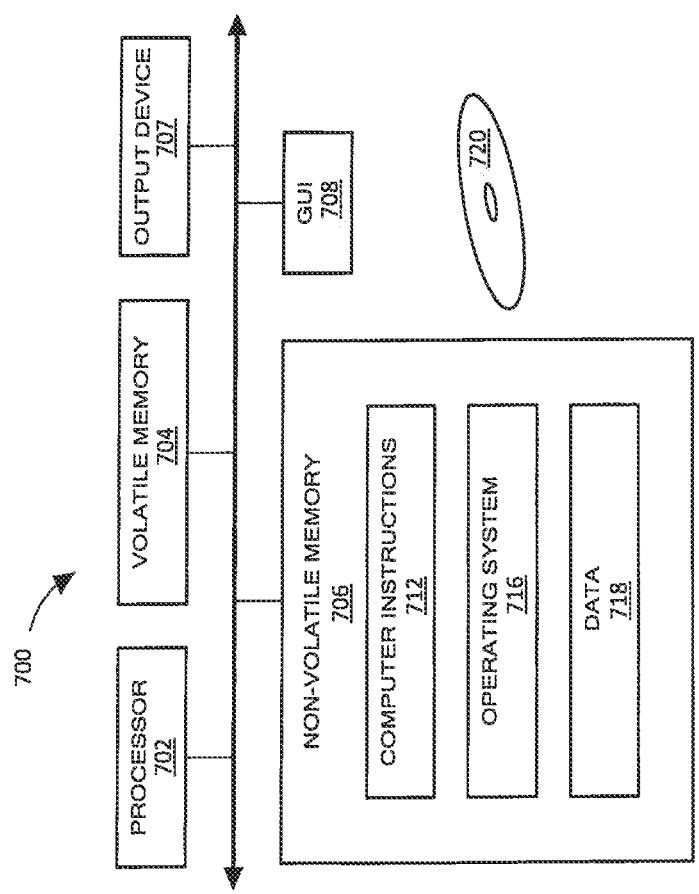
FIG. 7 is a block diagram of an illustrative computer that can perform at least a portion of the processing described herein.

FIG. 7 shows an exemplary computer 700 (e.g., physical or virtual) that can perform at least part of the processing described herein. The computer 700 includes a processor 702, a volatile memory 704, a non-volatile memory 706 (e.g., hard disk or flash), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   receiving, by a routing module of a content-addressable storage system, an input/output (IO) request;
   determining, by the routing module from a table that provides a listing of addresses and compute nodes having ownership to the address, a target location of the IO request, the target location specifying an address;
   determining, by the routing module, a mapping between each of the compute modules and a physical path to corresponding storage controllers, and an address owner of a storage controller port of a storage controller that owns the address of the IO;
   selecting a physical path associated with the address owner; and
   transmitting, by the routing module, the IO request to the storage controller port via a direct call.

2. The method of claim 1, further comprising:
   upon determining an event which causes a change to the address ownership, updating one or more entries of the table with new address ownership data.

3. The method of claim 2, wherein the event is a failover of one or more storage controllers.

4. The method of claim 2, wherein the event is and a cluster expansion of one of more storage controllers.

5. The method of claim 1, further comprising initializing entries of the table to provide to each of the entries the associated compute module that owns corresponding entries.

6. The method of claim 1, wherein transmitting the IO request to the storage controller port includes transmitting the IO request without sending data via remote direct memory access (RDMA).

7. The method of claim 1, wherein the content-addressable storage system is a distributed non-asymmetrical logical unit assignment (non-ALUA) system.

8. A system, comprising:
a memory comprising computer-executable instructions; and
a processor executing the computer-executable instructions, the computer-executable instructions when executed by the processor cause the processor to perform operations comprising:
receiving, by a routing module of a content-addressable storage system, an input/output (IO) request;
determining, by the routing module from a table that provides a listing of addresses and compute nodes having ownership to the address, a target location of the IO request, the target location specifying an address;
determining, by the routing module, a mapping between each of the compute modules and a physical path to corresponding storage controllers, and an address owner of a storage controller port of a storage controller that owns the address of the IO;
selecting a physical path associated with the address owner; and
transmitting, by the routing module, the IO request to the storage controller port via a direct call.

9. The system of claim 8, wherein the operations further comprise:
upon determining an event which causes a change to the address ownership, updating one or more entries of the table with new address ownership data.

10. The system of claim 9, wherein the event is one of a failover of one or more storage controllers and a cluster expansion of one of more storage controllers.

11. The system of claim 8, wherein the operations further comprise initializing entries of the table to provide to each of the entries the associated compute module that owns corresponding entries.

12. The system of claim 8, wherein transmitting the IO request to the storage controller port includes transmitting the IO request without sending data via remote direct memory access (RDMA).

13. The system of claim 8, wherein the content-addressable storage system is a distributed non-asymmetrical logical unit assignment (non-ALUA) system.

14. A computer program product embodied on a non-transitory computer readable medium, the computer program product including instructions that, when executed by a computer causes the computer to perform operations comprising:
receiving, by a routing module of a content-addressable storage system, an input/output (IO) request;
determining, by the routing module from a table that provides a listing of addresses and compute nodes having ownership to the address, a target location of the IO request, the target location specifying an address;
determining, by the routing module, a mapping between each of the compute modules and a physical path to corresponding storage controllers, and an address owner of a storage controller port of a storage controller that owns the address of the IO;
selecting a physical path associated with the address owner; and
transmitting, by the routing module, the IO request to the storage controller port via a direct call.

15. The computer program product of claim 14, wherein the operations further comprise:
upon determining an event which causes a change to the address ownership, updating one or more entries of the table with new address ownership data.

16. The computer program product of claim 15, wherein the event is one of a failover of one or more storage controllers and a cluster expansion of one of more storage controllers.

17. The computer program product of claim 14, wherein the operations further comprise initializing entries of the table to provide to each of the entries the associated compute module that owns corresponding entries.

18. The computer program product of claim 14, wherein transmitting the IO request to the storage controller port includes transmitting the IO request without sending data via remote direct memory access (RDMA).

19. The computer program product of claim 14, wherein the content-addressable storage system is a distributed non-asymmetrical logical unit assignment (non-ALUA) system.

20. The computer program product of claim 14, wherein the table includes 1024 entries, each of the entries owned by a corresponding compute module.

* * * * *